(12) United States Patent
Kramer

(10) Patent No.: US 7,197,921 B2
(45) Date of Patent: Apr. 3, 2007

(54) SYSTEM AND METHOD FOR DETECTING MOTION OF AN OBJECT

(75) Inventor: Bradley Allen Kramer, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 75 days.

(21) Appl. No.: 11/029,158

(22) Filed: Jan. 4, 2005

(65) Prior Publication Data

US 2006/0144134 A1   Jul. 6, 2006

(51) Int. Cl.
*E01C 23/00* (2006.01)

(52) U.S. Cl. .................................... 73/146

(58) Field of Classification Search ............. 73/146, 73/146.2, 146.4, 146.8; 340/444, 426.11
See application file for complete search history.

(56) References Cited

U.S. PATENT DOCUMENTS

| | | | |
|---|---|---|---|
| 5,463,374 A | 10/1995 | Mendez et al. | |
| 6,417,766 B1 | 7/2002 | Starkey | |
| 6,445,287 B1 | 9/2002 | Schofield et al. | |
| 6,489,888 B1 | 12/2002 | Honeck et al. | |
| 6,518,876 B1 | 2/2003 | Marguet et al. | |
| 6,580,365 B2 | 6/2003 | Starkey | |
| 6,788,193 B2 | 9/2004 | King et al. | |
| 6,885,296 B2 * | 4/2005 | Hardman et al. | 340/505 |
| 6,922,140 B2 * | 7/2005 | Hernando et al. | 340/444 |
| 6,956,466 B2 * | 10/2005 | Caretta et al. | 340/426.11 |

* cited by examiner

*Primary Examiner*—Jewel Thompson
(74) *Attorney, Agent, or Firm*—William B Kempler; W. James Brady; Frederick J. Telecky, Jr.

(57) ABSTRACT

Systems and methods are disclosed to for detecting movement of an object. In one embodiment, a system is disclosed to detect movement of an object (e.g., a tire). The system includes a sensor that is operative to sense at least a pressure condition within an enclosed space of the object based on an operating mode of the system. A control system controls the operating mode of the system based at least in part on whether movement of the object is detected. The movement of the object is detected based on a variation in the at least a pressure condition over time. The system can be implemented as part of a tire pressure monitoring system.

18 Claims, 3 Drawing Sheets

SYSTEM AND METHOD FOR DETECTING MOTION OF AN OBJECT

TECHNICAL FIELD

This invention relates generally to a system and method that can be employed to detect motion of an object.

BACKGROUND

The federal government has enacted the Transportation Recall Enhancement, Accountability, and Documentation (TREAD) Act. The TREAD Act proposes to require that certain passenger vehicles eventually be equipped with a tire pressure monitoring system (TPMS). There are two basic types of TPMSs: direct TPMSs and indirect TPMSs. A direct TPMS includes a tire pressure sensor in each tire. The sensors transmit pressure information to a receiver, which can be utilized to alert a driver of potential low tire pressure conditions. An indirect TPMS does not include tire pressure sensors. One type of indirect TPMS relies on the wheel rotational speed sensors in an anti-lock braking system (ABS) to detect and compare differences in the rotational speed of a vehicle's wheels. Those differences correlate to differences in tire pressure because decreases in tire pressure cause decreases in tire diameter that, in turn, cause increases in wheel rotational speed.

A direct TPMS and other types of systems are powered by an internal battery, which is not easily replaced. For example, since each tire pressure sensor is located within a tire, replacing the battery would require removing at least a portion of the tire from the wheel. Additionally, it is generally cost prohibitive to adequately secure a replaceable battery in a TPMS. Since the battery lifetime depends on power consumption of the sensor device, it is often desirable to detect movement of an object, such as a tire of a passenger vehicle. The detected movement of the tire thus can be employed to control operation of the tire pressure sensor in a way to conserve battery life.

Accordingly, various approaches have been developed to detect movement of tires implementing a TPMS. For example, one approach is to employ an electromechanical device configured to detect movement of a vehicle tire, such as whether the tire is rolling or the tire is stationary. One type of device is a roll sensor or accelerometer switch that is operative to change states and provide an indication of movement of the associated tire. As an example, the roll sensor may be formed of a switch having a mechanical portion that is movable commensurate with movement of a rolling vehicle tire so as to change states in response to movement of the vehicle tire.

Such roll sensors are often utilized in tire pressure monitoring systems to initiate a change in operating mode from a sleep mode when the tire is stationary and wake up and enter into a normal operating mode when the tire is moving. A general purpose of the roll sensor is to conserve battery power for an associated sensing system by reducing power consumption, such as by less frequent operation, when the vehicle is not in use. The addition of such a roll sensor in the TPMS, however, results in additional cost associated with the sensor in order to achieve the improved battery life. Another approach to increase the lifetime of a device, such as a TPMS is to utilize a longer lasting power source or battery. When such a battery is used, a roll sensor can be omitted, the pressure within the tire can be sensed and transmitted more frequently. Again, the longer lasting battery further increases the overall cost of each device.

SUMMARY

The present invention relates to a system and method that can be employed to detect motion of an object, such as tire that contains a volume of gas within an enclosed space.

One aspect of the present invention provides a system to detect movement of an object (e.g., a tire). A sensor is operative to sense at least a pressure condition within an enclosed space of the object based on an operating mode of the system. A control system controls the operating mode of the system based at least in part on whether movement of the object is detected. The movement of the object is detected based on a variation in the at least a pressure condition over time. The system can be implemented as part of a tire pressure monitoring system.

Another aspect of the present invention provides a tire pressure monitoring system. The system includes a pressure sensor that is operative to sense a pressure condition associated with a tire. A control system controls the pressure sensor to sense the pressure condition at a sample rate that varies based on whether movement of the tire is detected. A variation detector detects the movement of the tire based on determining at least a predetermined level of variation in the sensed pressure condition over a plurality of samples of the sensed pressure condition.

Still another aspect of the present invention provides a tire pressure monitoring system that includes means for sensing pressure of a tire and for providing an indication of the sensed pressure. The system also includes means for controlling the means for sensing pressure to sense the pressure based on whether movement of the tire is detected. The system also includes means for detecting movement of the tire as a function of variation in the indication of the sensed pressure over time.

Yet another aspect of the present invention provides a method for detecting movement of a tire. The method includes sensing at least a pressure condition associated with the tire and determining a variation for the at least a sensed pressure condition over time. Movement of the tire is detected based on the determined variation for the at least a pressure condition.

DETAILED DESCRIPTION

Figure 1:
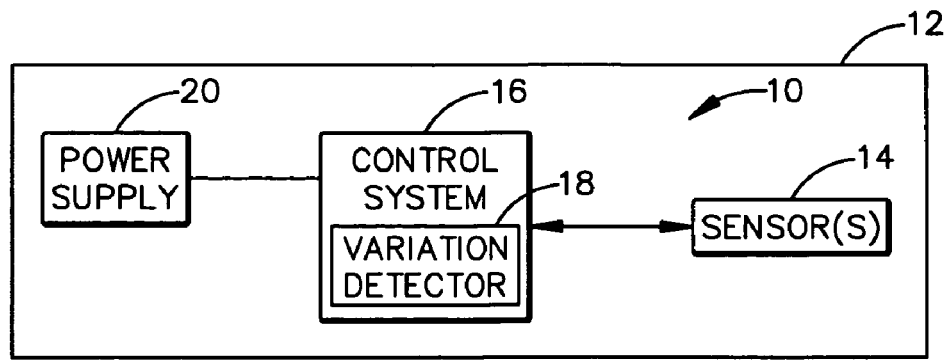
FIG. 1 depicts an example of a system for detecting movement of an object according to an aspect of the present invention.

FIG. 1 depicts an example of a system 10 that can be utilized to detect movement of an object 12 according to an aspect of the present invention. For purposes of simplicity of explanation and for sake of consistency, the system 10 of FIG. 1 and other embodiments will be described in the context of a tire pressure and monitoring system (TPMS).

Those skilled in the art may understand and appreciate other applications and implementations that can be realized for the system based on the teachings contained herein, all of which are contemplated by the appended claims.

The system 10 includes one or more sensors 14 that are operative to detect a condition within the object 12. As used herein, the term "sensor" can correspond to any transducer or device operative to detect, measure, or record a condition external or internal to the sensor as well as to respond to such condition by transmitting information or operating one or more controls based on the condition. As an example, the one or more sensors 14 may include at least a pressure sensor or a pressure sensor in combination with one or more other types of sensors, such as a temperature sensor. The one or more sensors 14 is coupled with a control system 16.

The control system 16 is operative to control operation of the system 10, including operation of the one or more sensors 14. The control system 16 can control the system 10 in any one of a plurality of operating modes. For instance, the operating modes can include a first operating mode (e.g., a sleep mode) in which the control system 16 operates the one or more sensors 14 at a first frequency. The operating modes can also include a second operating mode (e.g., a normal mode) in which the control system 16 operates the sensors at a second operating mode, which is more frequent than the first operating mode. The rate at which the control system 16 operates the one or more sensors 14 to sense the condition thus will vary according to the operating mode. Additionally, the control system 16 can transition from the first operating mode to the second operating mode in response to detecting movement of the object based on detecting a variation in the sensed condition or conditions while operating in the first mode. While operating in the second operation mode (e.g., during movement of the object), the control system 16 controls the one or more sensors 14 to sense the pressure within the object 12 more often than when in the first operating mode.

The control system 16 can include a variation detector 18 that detects movement of the object 12 when a variation in the condition or conditions sensed by the one or more sensors 14 exceeds a predetermined variation level. The control system 16 controls the operating mode of the system 10 based on whether movement is detected by the variation detector 18. The system 10 also includes a battery or other power source internal to the object 12 that provides operating power for the life time of the system 10.

By way of further example, assume that the system 10 corresponds to a tire pressure monitoring system mounted within an object, namely a tire of a vehicle, and that the one or more sensors 14 includes a pressure sensor. In this example, for a tire that is rolling, the rotational motion of the tire on a road or other surface will create variations in the amount of force that the tire exerts against the surface of the road. These variations in force vary as a function of time. The variations in force further create variations in pressure within the tire 12 as a function of time. Accordingly, when the tire pressure is varying significantly as a function of time, the variation detector 18 determines that the tire is rolling and provides an indication that the tire is rolling such that the control system can operate in the second operating mode, as mentioned above.

The variation detector 18 can store a plurality of samples of consecutive values indicative of the sensed pressure from the sensor 14 and, based on the stored samples, determine whether the object 12 is moving. Each of the samples is obtained at an interval that varies based on the operating mode. When the variation detector 18 determines that a variation in the pressure samples over time exceeds the predetermined variation level, the variation detector 18 can indicate that the object 12 is moving, such as due to normal rolling of a tire on a surface. In contrast, when the variation detector 18 determines that the variation in the pressure samples does not vary or varies at a level that does not equal or exceed the predetermined variation level, a determination is made that the tire is not rolling.

In view of the foregoing, it will be appreciated that the one or more sensors can be utilized for dual purposes. In particular, the system 10 can employ the pressure sensor (1) for sensing the pressure for providing an indication of the pressure within the object 12 (e.g., by transmitting such information to a central console of a vehicle), and (2) for providing an indication as to whether the object 12 is rolling or is otherwise experiencing time varying fluctuations and pressure. Since the pressure sensor serves the dual purpose, no roll sensor is required to control the operating mode of the system 10. Thus, the system 10 can enter a sleep mode wherein the control system 16 controls the sensor 14 to detect the pressure less frequently when the vehicle is not moving so as to conserve power. As a result, there can be a significant cost savings in the manufacture of a TPMS that incorporates the system 10.

Figure 2:
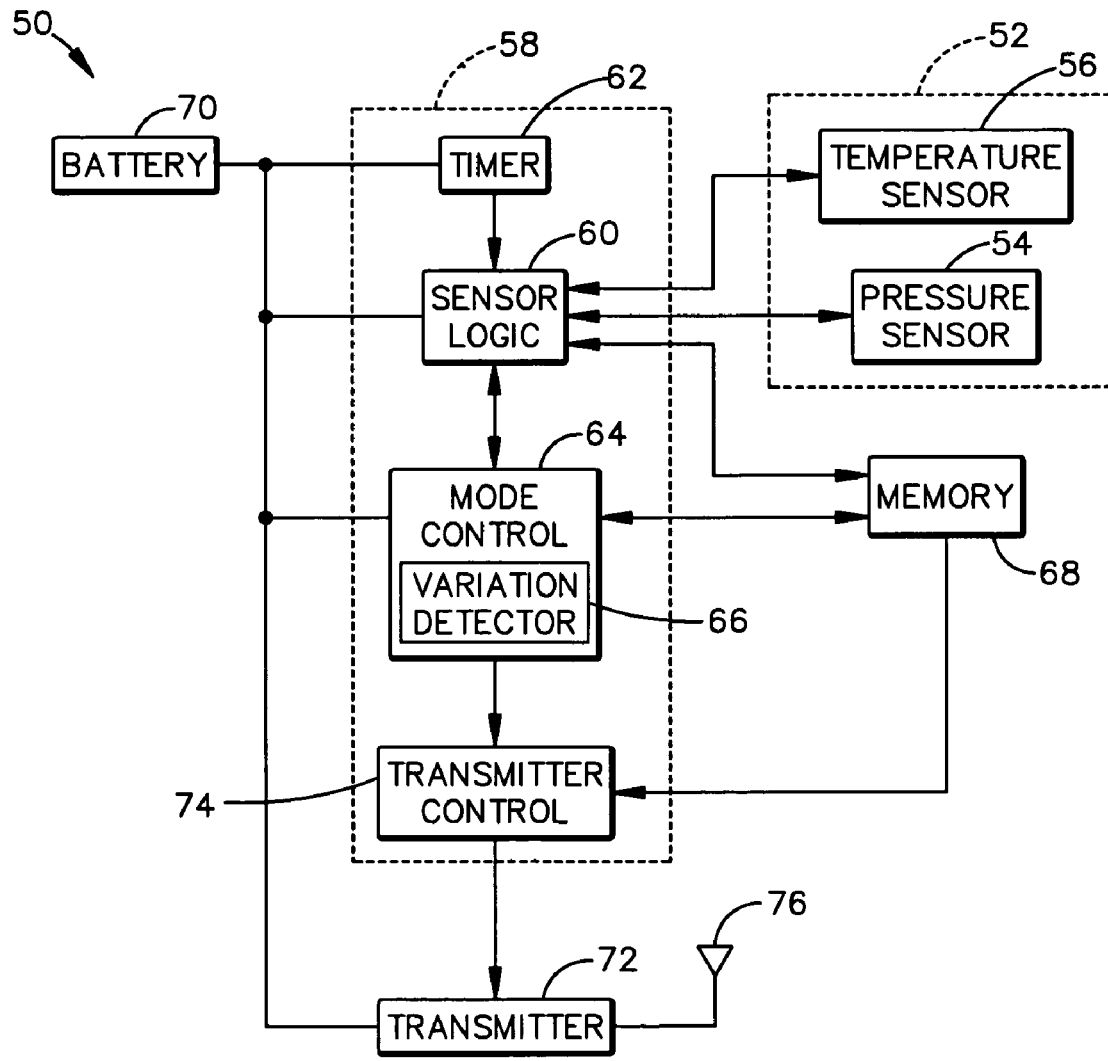
FIG. 2 depicts an example of another system for detecting movement of an object according to an aspect of the present invention.

FIG. 2 depicts an example of a TPMS 50 that can be implemented in accordance with an aspect of the present invention. The system 50 includes one or more sensors 52, indicated as including a pressure sensor 54 and a temperature sensor 56. Those skilled in the art will understand and appreciate various types of transducers that can be utilized to provide the one or more sensors 52 for use in monitoring tire pressure.

The system 50 includes a control system 58 that is operative to control operation and implement the functionality of the system 50. The control system 58 includes sensor logic 60 that is operative to control operation of the pressure sensor 54 and temperature sensor 56. The sensor logic 60 can receive a signal from a timer 62 that provides a timer value, which can be utilized to control when the pressure sensor 54 and temperature sensor 56 are activated. When the sensor logic 60 activates the pressure sensor 54 and temperature sensor 56, each of the sensors provides an indication of the sensed condition, such as a value indicative of pressure and temperature, respectively.

A mode control block 64 is also coupled to the sensor logic 60 for controlling an operating mode of the system 50. The mode control block 64, for example, can implement a state machine (e.g., in hardware or software) that transitions among available states and operating modes based on conditions associated with the system 50. As an example, the mode control block 64 can operate in at least two operating modes, including a sleep mode and a normal mode. In the sleep mode, the mode control block 64 can provide a mode control signal that is utilized by the sensor logic to activate the temperature sensor and pressure sensor at a time interval corresponding to the present operating mode. For instance, during the sleep mode, the mode control block 64 can activate or wake up the system 50 periodically, such as at an interval of every two to three minutes. In the normal mode, the sensor logic 60 can activate the pressure sensor 54 and temperature sensor 56 more often, such as every thirty seconds. Other time intervals could also be utilized in each of the respective operating modes and more than two modes can be utilized by the system 50.

As one means for controlling the operating mode of the system 50, the mode control block 64 can include a variation detector 66. The variation detector 66 is operative to detect variations in one or more sensed conditions to determine whether or not an object in which the system 50 is mounted is moving. The variation detector 66 can determine whether the object is moved based on detecting variations in the sensed pressure condition over a plurality of samples. The variation detector 66 is operative to ascertain an amount of variation in the sensed condition(s) over a plurality of samples (e.g., 3 or 4 more samples) of at least the pressure condition sensed by the pressure sensor 54.

By way of further example, the variation detector 66 can be operative to determine a statistical variation in a sensed pressure condition over a plurality of samples (e.g., a standard deviation). For instance, if the statistical variation in the samples exceeds a predetermined variation level, the variation detector 66 can ascertain that the object in which the system 50 is implemented is moving. In contrast, when the variation in the plurality of samples does not exceed the predetermined variation level, the variation detector 66 determines that the object in which the system 50 is mounted is not moving. When it is determined that the object in which the system 50 is mounted is no longer moving, the mode control block 64 enters the sleep mode in which the sensor logic and other circuitry is operated less often than when operating in the normal mode.

As an alternative, the variation detector 66 can detect movement of the object when the determined variation is within a predefined range of variation. As another alternative, the variation detector 66 can detect movement of the object when an aggregation of the determined variation over a plurality of samples matches one or more of a plurality of predetermined variation profiles. The variation profiles can be determined to correspond to pressure variations associated with a plurality of different known road conditions.

The system 50 includes memory 68 that is configured to store sensor data for the plurality of samples of the one or more sensed conditions. For instance, the memory 68 can store the sensor data as multi-bit values corresponding to sensed pressure or values corresponding to sensed pressure and temperature conditions for each of the samples. The memory 68 can be implemented as a non volatile memory (e.g., EPROM or flash memory) or volatile memory (e.g., low leakage RAM). The memory 68 can store the sensor data in any data structure, such as a FIFO (first-in-first-out) structure that maintains sensor data for the plurality of samples (e.g., 3 or 4 samples). While the memory 68 is shown coupled to receive the sensor data from the sensor logic 60, the sensor data could be directly written to the memory 68 from each of the one or more sensors 54 and 56 via other data paths when activated by the sensor logic 60.

If the memory 68 is implemented as a volatile type of memory, such as RAM, the memory 68 would be coupled to an associated battery 70 that is utilized to provide power to the system 50. As shown in FIG. 2, the battery 70 is also coupled to provide power to other components of the system, such as including the timer 62, sensor logic 60, mode control block 64 and an associated transmitter 72. The battery 70 can be implemented as one or more devices or power systems capable of storing and providing electrical energy for powering components of the system 50.

Additionally, the control system 58 can include a transmitter control block 74 that is operative to control the transmitter 72. The transmitter control block 74 can control the transmitter 72 to transmit an indication of the sensed condition (e.g., pressure and/or temperature) at a time interval that depends upon the operating mode determined by the mode control block 64. That is, the mode control block 64 provides an indication of the operating mode to the transmitter control block 74. The transmitter control block 74 is operative to control the transmitter 72 to transmit an indication of at least one of the sensed parameters such as pressure, via an associated antenna 76. For instance, the transmitter control block 74 can obtain an indication of one or more of the sensed conditions (e.g., corresponding to one or more stored samples) from the memory 68 and provide such information to the transmitter 72. The transmitter 72 can in turn transmit the sensed condition information via the antenna 76 to an associated receiver (not shown). The transmitter control block 74 also can include identification information that uniquely identifies the system 50 relative to other systems in a larger TPMS of a vehicle so that the receiving unit can determine from which of a plurality of systems the sensed condition data originated. Those skilled in the art will understand and appreciate various ways in which the data from the system 50 can be transmitted to enable a receiving unit to determine a location of the system 50.

Figure 3:
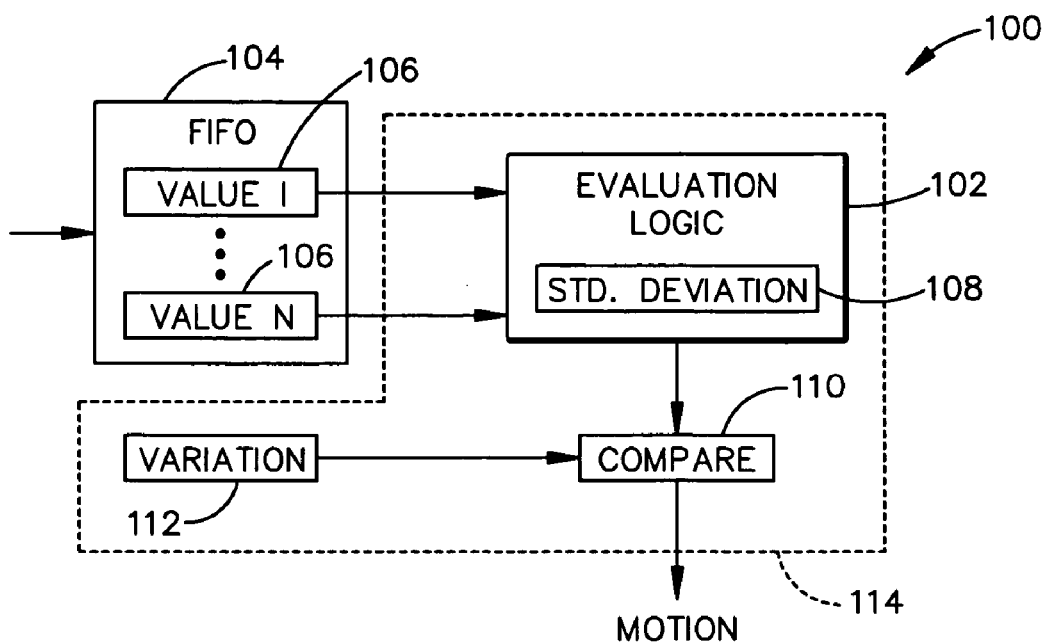
FIG. 3 depicts an example of a portion of a system that can be utilized for detecting movement of an object.

FIG. 3 depicts an example of part of a motion detection system 100 that can be utilized to detect movement of an object, such as a tire, according to an aspect of the present invention. The system 100 can be implemented by any of the examples shown and described herein. The system 100 includes evaluation logic 102 that receives an indication of one or more sensed conditions over a plurality of samples from associated memory 104. The memory 104 can include a plurality of memory blocks or regions in which the sensor data can be stored. In the example of FIG. 3, the memory 104 can be implemented as a FIFO data structure that includes a samples of sensor values 106 indicated at VALUE 1 through VALUE N, where N is a positive integer greater than one. The values 106 stored in the memory 104 can be provided (directly or indirectly) as a value indicative of a condition sensed by one or more sensors, such as including a pressure sensor.

The evaluation logic 102 can be configured to ascertain an amount of variation among some or all of the sensor values 106 stored in the memory 104. For example, the evaluation logic 102 can include a standard of deviation function 108 that is operative to determine a standard deviation among the values 106 stored in the memory 104. The evaluation logic 102 provides a value indicative of the standard deviation to a comparator block 110. The comparator block 110 compares the standard deviation with a predetermined variation level 112. The predetermined variation level 112 can be determined based upon experimentation. The predetermined variation level 112 can vary according to the type and sensitivity of the pressure sensor that is utilized to provide the sensor values 106. Additionally, it may be desirable to implement a calibration phase for the system 100 to set the variation level 112 after the sensor has been mounted within an object such as a vehicle tired and inflated to a desired pressure. In this way, the system 100 can be configured to better accommodate and detect pressure variations that may differ according to the type and configuration of tire.

The comparator block 110 provides an output (MOTION) signal indicating whether the object is moving or not moving. For example, when the standard deviation exceeds the variation level 112, the comparator block 110 can provide the MOTION signal to indicate that rolling movement of an associated tire has been detected. In contrast, when the standard deviation does not meet or exceed the level 112, the comparator block 110 provides the MOTION signal to indicate that the tire is not moving. The evaluation logic 102 and the comparator block 110 can be implemented within a microcontroller or state machine or an ASIC (application specific integrated circuit), indicated schematically by dashed line 114. Those skilled in the art will understand and appreciate how such hardware can be programmed and/or configured based on the teachings herein to implement motion detection.

Figure 4:
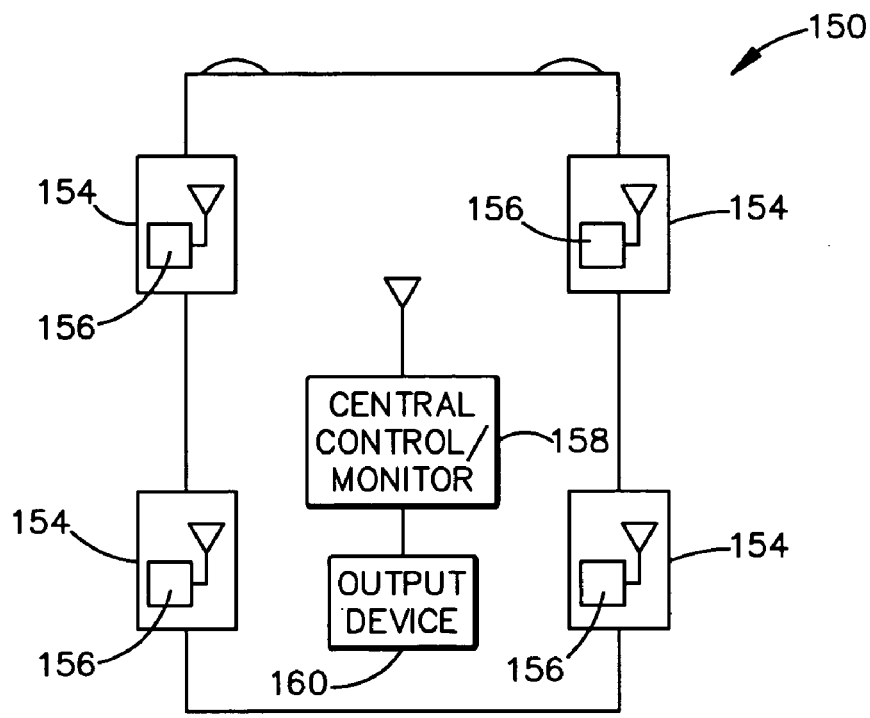
FIG. 4 depicts an example of a tire pressure monitoring system implementing a motion detection system according to an aspect of the present invention.

FIG. 4 depicts an example of a vehicle 150 implementing a TPMS according to an aspect of the present invention. In the example of FIG. 4, the vehicle 150 includes a plurality of tires 154. A tire pressure sensor module 156 is located within each tire 154. Each module includes at least a pressure sensor and may include a combination of a pressure sensor and temperature sensor, such according to any of the examples shown and described with respect to FIGS. 1, 2, 3 or 5. The module 156 thus is operative to periodically, depending upon a given operating mode, sense the pressure within a given tire 154 and based on the sensed pressure over a plurality of samples determine whether the given tire is rolling.

The sample rate at which each module 156 is activated depends on the operating mode of the module. The operating mode of a given module further depends, at least in part, on whether motion of a respective tire 154 is detected. As described herein, motion is detected based on detecting variations in the sensed pressure condition within a given tire. Each module 156 further is operative to transmit a wireless signal to a central control/monitor block 158 indicative of a sensed tire pressure condition. While the central control/monitor block 158 is depicted in FIG. 4 as having a single antenna, those skilled in the art will understand and appreciate that a separate antenna structure can be associated with each respective module 156. The separate antenna can be proximal or remote to each tire location to facilitate transmission from each module 156 to the central control/monitor block 158.

Also depicted in FIG. 4 is an output device 160 that can be utilized to provide information that identifies one or more sensed conditions for the respective tires 154 to a user. Those skilled in the art will understand and appreciate various types of graphical, text based and/or audible indications that can be utilized to provide an indication of the sensed pressure of the respective tires. Additionally, pressure and temperature can be utilized together to provide a more accurate indication of pressure, which varies as a function of temperature. By employing the pressure sensor in each module 156 to detect movement of a given tire 154, other motion detection circuitry can be omitted, thereby reducing the overall cost per module. Additionally, since operating mode of a given module can be controlled based on detecting movement internally within each tire, power can be conserved when the tire is not moving so as to enhance the lifetime of the module with a less expensive battery.

Figure 5:
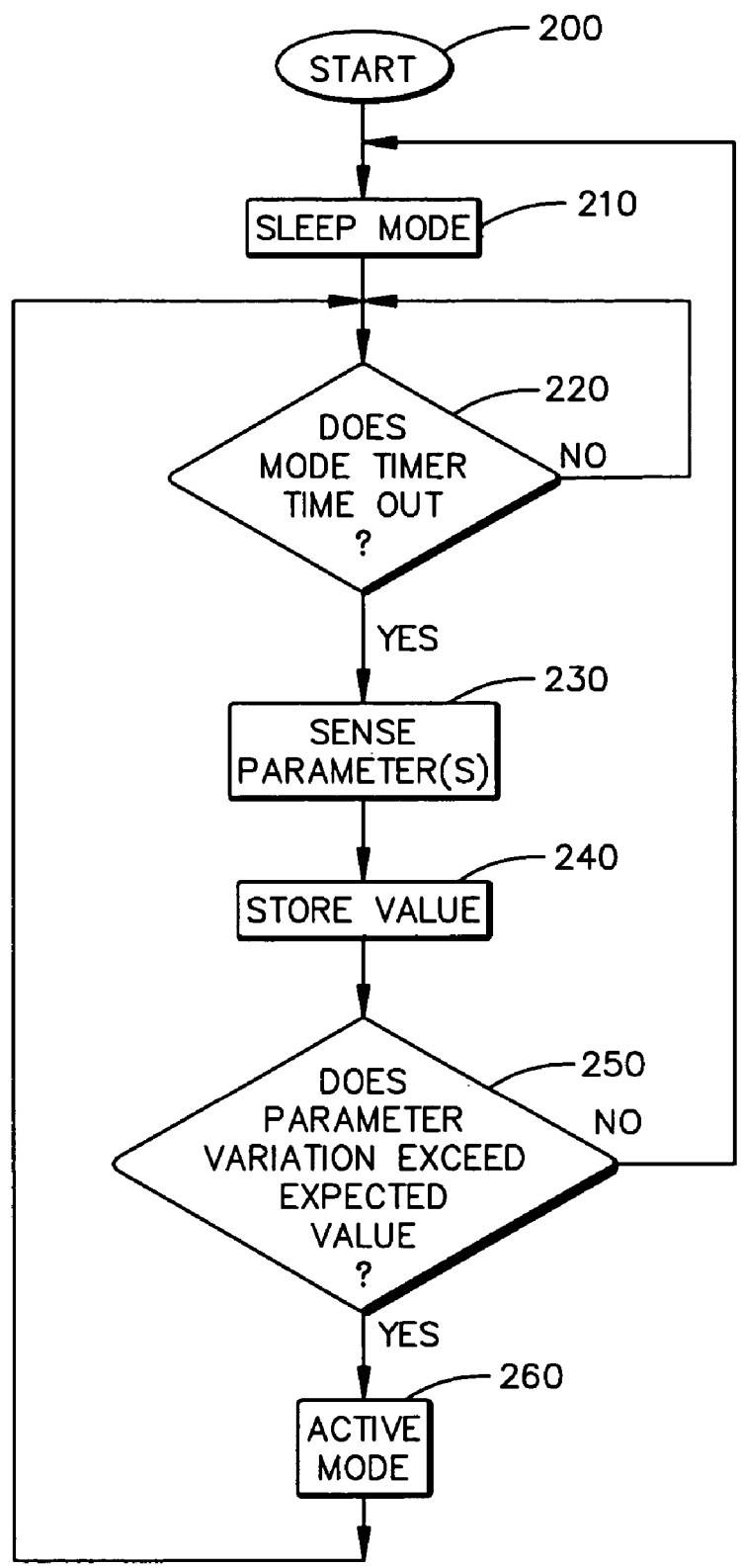
FIG. 5 is a flow diagram depicting a method for detecting movement of an object according to an aspect of the present invention.

FIG. 5 depicts a method that can be performed for detecting movement of an object according to an aspect of the present invention. While, for purposes of simplicity of explanation, the methodology of FIG. 5 is shown and described as executing serially, it is to be understood and appreciated that the present invention is not limited by the order shown, as some aspects may, in accordance with the present invention, occur in different orders or concurrently from that shown and described herein. Moreover, not all features shown or described may be needed to implement a method in accordance with the present invention. Other acts or steps further can also be implemented in conjunction with those shown and described with respect to FIG. 5. Additionally, the method can be implemented in hardware (e.g., analog circuitry, digital circuitry or a combination thereof), software (e.g., running on a DSP, state machine or ASIC) or a combination of hardware and software.

FIG. 5 depicts an example of a method that can be utilized to detect motion of an object or enclosure in which a sensing system is implemented. For example, the method can be implemented by a pressure sensor system located within a pressurized environment, such as tire that is mounted to a vehicle axle. The method begins at 200 such as at power up when the power supply is attached to the sensing system located within the object. An initialization at power up can include operation in a given start mode. In the example of FIG. 5, the initial operating mode is indicated as a sleep mode at 210, although the method could equally begin in a different mode. The sleep mode is utilized to provide for a less frequent operation or activation of the associated sensing device located within the object, such as to conserve power when a vehicle is parked.

From 210 the method proceeds to 220 in which a determination is made as to whether a mode timer is timed out. The mode timer can count to a maximum value, which varies based on the operating mode. After reaching the maximum count value (e.g., corresponding to a time out event), the mode counter can reset. The maximum count value thus determines the time interval between activation of adjacent sensing events. If the mode timer does not time out (NO), the method can loop at 210 and remain in its present mode (e.g., sleep mode). After the mode timer times out (YES), the method proceeds from 220 to 230 in which one or more parameters are sensed. The sensed parameters can include pressure within the object (e.g., a vehicle tire). In conjunction with sensing the parameter, the sensed condition information can also be transmitted (not shown) for use by a central control system, such as described herein. From 230 the method proceeds to 240 in which a value indicative of the sensed parameter is stored. The value, for example, can include a multi-bit representation of the sensed pressure and/or temperature condition. A plurality of values indicative of sensed parameter(s) can be stored in the memory, such corresponding to a plurality of samples of the parameter(s) values sensed at 230 (e.g., over a series of consecutive iterations at 230).

From 240, the method proceeds to 250 in which a determination is made as to whether a parameter variation exceeds an expected value. For example, the parameter variation can be determined based on a plurality of values stored at 240 over a plurality of samples. Thus, the parameter variation can be determined based on ascertaining a level of variation over a plurality of samples in which the parameters are sensed at 230. The expected value can correspond to a predetermined value that is utilized as a threshold to determine whether the object is moving or rolling or is stationary. If the parameter variation does not exceed the expected value (NO), the method returns to 210 and remains in (or transitions to) the sleep mode to sense the one or more parameters at 230 each time the mode timer times out for the sleep mode. Thus, if the parameter does not exceed the expected value, the object is substantially stationary, as determined based on the absence of a pressure variations over time. In contrast, if the parameter variation at 250 does exceed the expected value (YES), the method proceeds to 260.

At 260, the method enters the active mode and then returns to 220. Entering the active mode can set the maximum value for the mode timer to a value that provides for more often or more frequent activation of sensing at 230. For example, in the active mode, one or more sensors can sense pressure sensing parameters more frequently than during the sleep mode. Additionally, in the active mode, the sensed condition(s) can be transmitted with each sensing thereof at 230. Alternatively, other approaches or durations can be employed to control how often the sensed condition data is transmitted during the active mode as well as during the sleep mode.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system to detect movement of an object, comprising:
   a sensor that is operative to sense at least a pressure condition within an enclosed space of the object based on an operating mode of the system;
   a control system that controls the operating mode of the system based at least in part on whether movement of the object is detected, the movement of the object being detected based on a variation in the at least a pressure condition over time and
   a variation detector that detects the movement of the object if the at least a pressure condition exceeds a predetermined level of variation over a plurality of samples.

2. The system of claim 1, further comprising memory that stores a value indicative of the at least a pressure condition for each of a plurality of samples.

3. The system of claim 1, further comprising memory that stores a value indicative of the at least a pressure condition for each of a plurality of samples, the variation detector being operative to determine a statistical variation in the values stored in the memory, the control system controlling the sensor in a first mode if the statistical variation exceeds the predetermined level of variation and controlling the sensor in a second mode if the statistical variation does not exceed the predetermined level of variation, such that the sensor is activated more often in the first mode.

4. The system of claim 1, wherein the control system controls the sensor to sense at a greater rate in a first operating mode corresponding to when the movement of the object is detected than in a second operating mode when the movement of the object is not detected.

5. The system of claim 1, further comprising a temperature sensor, the at least a pressure condition further comprising a pressure condition that is sensed by a pressure sensor and a temperature condition that is sensed by the temperature sensor.

6. The system of claim 1, further comprising
   an evaluator that determines an indication of the variation based on each of a plurality of samples of the at least a pressure condition over time; and
   a comparator that compares the indication of variation relative to a predetermined variation level, the movement of the object being detected based on the comparison.

7. The system of claim 1, further comprising a transmitter, the control system causing the transmitter to transmit a signal that includes a value indicative of the at least a pressure condition based on the operating mode.

8. A tire pressure monitoring system comprising:
   a plurality of tire pressure sensing modules, each of the plurality of tire pressure sensing modules including a system according to claim 1 that is operative to sense the at least a pressure condition associated with each of a plurality of respective tires mounted for movement on a vehicle; and
   a central control system that receives signals from each of the plurality of tire pressure sensing modules.

9. A tire pressure monitoring system comprising:
   a pressure sensor that is operative to sense a pressure condition associated with a tire;
   a control system that controls the pressure sensor to sense the pressure condition at a sample rate that varies based on whether movement of the tire is detected; and
   a variation detector that detects the movement of the tire based on determining at least a predetermined level of variation in the sensed pressure condition over a plurality of samples of the sensed pressure condition;
   memory that stores a value indicative of the sensed pressure condition for each of a plurality of samples of the sensed pressure condition;
   an evaluator that determines an indication of the variation in the sensed pressure condition based on the value stored in the memory for each of the plurality of samples of the sensed pressure condition; and
   a comparator that compares the indication of variation relative to a predetermined variation level, the variation detector detecting the movement of the object based on the comparison.

10. A tire pressure monitoring system comprising:
    a pressure sensor that is operative to sense a pressure condition associated with a tire;
    a control system that controls the pressure sensor to sense the pressure condition at a sample rate that varies based on whether movement of the tire is detected;
    a variation detector that detects the movement of the tire based on determining at least a predetermined level of variation in the sensed pressure condition over a plurality of samples of the sensed pressure condition; and
    memory that stores a value indicative of the sensed pressure condition for each of a plurality of samples of the sensed pressure condition wherein the variation detector determines a statistical variation in the values stored in the memory for the plurality of samples, the control system controlling the pressure sensor to sense in a first mode if the statistical variation exceeds the predetermined level of variation and controlling the pressure sensor in a second mode if the statistical variation does not exceed the predetermined level of variation, the pressure sensor being activated more often in the first mode than in the second mode.

11. The system of claim 9, further comprising a temperature sensor that senses temperature of the tire, the variation detector detecting the movement of the tire as a function of variation in the sensed pressure and the sensed temperature over a plurality of samples.

12. The system of claim 9, further comprising a transmitter, the control system controlling the transmitter to transmit a signal that includes a value indicative of the sensed pressure condition based on an operating mode of the system, the operating mode of the system varying based on whether the variation detector detects the movement of the tire.

13. A tire pressure monitoring system comprising:
    means for sensing pressure of a tire and for providing an indication of the sensed pressure;

means for controlling the means for sensing pressure to sense the pressure based on whether movement of the tire is detected; and means for detecting movement of the tire solely as a function of variation in the indication of the sensed pressure over time.

14. The system of claim 13, further comprising means for storing a value for the indication of the sensed pressure for each of a plurality of samples.

15. The system of claim 13, further comprising means for controlling an interval between consecutive times when the means for sensing senses the pressure of the tire based on an operating mode of the system, the operating mode varying based on whether the movement of the tire is detected.

16. The system of claim 13, further comprising means for transmitting the indication of the sensed pressure from the system.

17. A method for detecting movement of a tire, comprising:

sensing at least a pressure condition associated with the tire;

determining a variation for the at least a sensed pressure condition over time; and detecting movement of the tire based on the determined variation for the at least a pressure condition;

controlling an operating mode of a tire pressure monitoring system based on the detected movement of the tire, the tire pressure monitoring system operating in a first mode when the determined variation for the at least a pressure condition exceeds an expected value and operating in a second mode when the determined variation for the at least a pressure condition does not exceed the expected value, the sensing occurring more often in the first mode than in the second mode.

18. The method of claim 17, further comprising transmitting an indication of the at least a pressure condition based on the operating mode of the tire pressure monitoring system.

* * * * *